United States Patent
Binder et al.

(10) Patent No.: US 6,368,644 B1
(45) Date of Patent: *Apr. 9, 2002

(54) POURABLE FEED ADDITIVES CONTAINING D-PANTOTHENIC ACID AND/OR SALTS THEREOF, AND PROCESS FOR THEIR PREPARATION

(75) Inventors: Michael Binder, Steinhagen; Matthias Moll, Hanau; Dieter Greissinger, Niddatal; Alexander Moeller, Gelnhausen; Walter Pfefferle, Halle, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/895,318

(22) Filed: Jul. 2, 2001

(30) Foreign Application Priority Data

Jul. 4, 2000 (DE) .......................... 100 32 349

(51) Int. Cl.⁷ .............................................. A23L 1/302
(52) U.S. Cl. ......................... 426/72; 426/74; 426/656; 426/807
(58) Field of Search ........................... 426/72, 74, 656, 426/807

(56) References Cited

U.S. PATENT DOCUMENTS

| | | | |
|---|---|---|---|
| 2,864,701 A | 12/1958 | La Pierre | 99/2 |
| 2,918,370 A * | 12/1959 | Helgren et al. | 99/2 |
| 3,862,337 A * | 1/1975 | Osborne | 426/2 |
| 4,552,775 A * | 11/1985 | Baeling et al. | 426/624 |
| 4,868,180 A | 9/1989 | Izuhara et al. | 514/251 |
| 4,977,190 A | 12/1990 | Meyer et al. | 514/951 |
| 5,133,976 A * | 7/1992 | Rovy | 426/2 |
| 5,431,933 A * | 7/1995 | Binder et al. | 426/60 |
| 5,518,906 A * | 5/1996 | Hikichi et al. | 435/116 |
| 5,622,710 A * | 4/1997 | Binder et al. | 424/438 |
| 5,840,358 A * | 11/1998 | Hofler et al. | 426/467 |
| 5,932,457 A * | 8/1999 | Moriya | 435/146 |
| 6,013,492 A * | 1/2000 | Nishimura | 435/106 |
| 6,238,714 B1 * | 5/2001 | Binder et al. | 426/72 |
| 6,319,528 B1 * | 11/2001 | Binder et al. | 426/72 |

FOREIGN PATENT DOCUMENTS

| | | | |
|---|---|---|---|
| EP | 493060 | * | 7/1992 |
| EP | 1 050 219 | | 11/2000 |
| GB | 598177 | * | 2/1948 |
| GB | 784434 | * | 10/1957 |
| WO | 9633283 | * | 10/1996 |
| WO | 9736996 | * | 10/1997 |

OTHER PUBLICATIONS

Patent Abstracts of Japan, JP 58–205461, Nov. 30, 1983.

* cited by examiner

*Primary Examiner*—Chhaya D. Sayala
(74) *Attorney, Agent, or Firm*—Oblon, Spivak, McClelland, Maier & Neustadt, P.C.

(57) ABSTRACT

A composition including at least one of D-pantothenic acid and a salt of D-panthothenic acid, greater than 50 percent of non-biomass constituents of a D-pantothenic fermentation liquor, and 0 to 100% of the biomass from D-pantothenic fermentation liquor wherein composition is a solid, pourable composition in the form of particles.

21 Claims, No Drawings

POURABLE FEED ADDITIVES CONTAINING D-PANTOTHENIC ACID AND/OR SALTS THEREOF, AND PROCESS FOR THEIR PREPARATION

BACKGROUND OF THE INVENTION

1. Field of the Invention

The invention relates to pourable animal feed additives based on fermentation liquor and containing D-pantothenic acid and/or a salt thereof, and to a process for the preparation of such additives.

2. Discussion of the Background

Pantothenic acid is produced worldwide on a scale of several thousand tons per year, and demand for the product is increasing. Much of the pantothenic acid that is produced is used for feeding productive livestock such as poultry and pigs.

Pantothenic acid can be produced by biotechnology or by chemical synthesis. Biotechnology methods involve fermentation of suitable microorganisms in appropriate nutrient solutions. In chemical synthesis, DL-pantolactone is an important precursor. It is prepared in a multi-step process from formaldehyde, isobutylaldehyde and cyanide where the racemic mixture is resolved, the D-pantolactone is condensed with β-alanine, and D-pantothenic acid is thus obtained.

The typical commercial form of pantothenic acid is the calcium salt of D-pantothenic acid. The calcium salt of the racemic mixture of D,L-pantothenic acid is also common.

The advantage of preparing pantothenic acid by means of fermentation of microorganisms is that the desired stereoisomeric form, namely the D form, which is free of L-pantothenic acid, is formed directly.

Various types of bacteria, such as, for example, *Escherichia coli, Arthrobacter ureafaciens, Corynebacterium erythrogenes, Brevibacterium ammoniagenes*, and also yeasts, such as, for example, *Debaromyces castellii*, are able to produce D-pantothenic acid under suitable fermentation conditions, as is shown in EP-A-0 493 060, EP-A-0 590 857 and WO 97/10340. Especially suitable microorganisms are the *Escherichia coli* IFO03547 derivatives described therein, such as, for example, the strains FV5069/pFV31 or FV5069/pFV202.

In the preparation of D-pantothenic acid by fermentation, as is described in EP-A-0 493 060, EP-A-0 590 857 and WO 97/10340, a microorganism capable of producing D-pantothenic acid is cultivated in a suitable nutrient medium and the D-pantothenic acid that forms is then isolated, purified and prepared in the form of the calcium salt in a complicated manner.

Suitable nutrient media contain a carbon source, a nitrogen source, a phosphorous source, salts, trace elements and vitamins, and optionally, complex media additives, such as yeast extract. Examples of the carbon source include glucose, starch flour hydrolysate, sucrose and molasses. An example of the nitrogen source is ammonium sulfate. An example of the phosphorous source is potassium phosphate.

According to the current prior art described in WO96/33283 and EP-A-0 590857, the calcium salt of D-pantothenic acid is obtained from the pantothenic acid-containing fermentation liquor by means of a complex isolation and purification operation. After first separating off the biomass by filtration or centrifugation, the filtrate is further purified by means of activated carbon or by column chromatography. After reaction of the resulting solutions with calcium hydroxide, the desired Ca salt is allowed to crystallize.

According to WO 96/33283, the filtrate is decoloured with activated carbon in the first column. A pH value of 3.0 is adjusted using concentrated hydrochloric acid, and the liquid is then purified continuously over two further columns packed with activated carbon. Elution of the D-pantothenic acid takes place with the aid of methyl alcohol. Subsequent neutralisation using $Ca(OH)_2$ powder yields a solution from which calcium D-pantothenate is obtained by crystallisation at 5° C.

In the method described in EP-A-0 590 857, the filtrate is first purified with the aid of cation- and anion-exchanger columns. Elution takes place with hydrochloric acid. The eluted fraction is then neutralised using $Ca(OH)_2$; activated carbon is added thereto and the whole is filtered off. The filtrate that is obtained is then extracted in a low molecular weight alcohol (methanol, ethanol, isopropanol), and calcium D-pantothenate is obtained by crystallisation.

The calcium D-pantothenate prepared in the described manner is used as an additive in animal feed.

OBJECT OF THE INVENTION

According to the prior art, salts of D-pantothenic acid or D,L-pantothenic acid are obtained by chemical synthesis or from fermentation liquors and then added in pure form to feeds.

The object of the invention is to provide more readily processable forms of D-pantothenic acid and its salts and processes for the preparation thereof for feeds.

DESCRIPTION OF THE INVENTION

The present invention provides a pourable animal feed additive based on fermentation liquor and containing D-pantothenic acid and/or salts thereof. The feed additive is characterized in that a) it contains the biomass formed during the fermentation in an amount of from $\geq 0$ to 100%; and b) it contains at least the predominant part of the further constituents of the fermentation liquor; and c) it is in solid form, in a particle size distribution of from 20 to 2000 μm, especially from 50 to 800 μm, more especially from 150 to 600 μm, and is pourable.

In a preferred embodiment of the invention, the pourable animal feed additive containing D-pantothenic acid and/or salts thereof is characterized in that it additionally contains, in solid form, an amount of chloride-containing constituents in a concentration of <3 mg per g of additive, preferably <2 mg per g of additive and especially <1.5 mg per g of additive.

The additives are generally compacted, granulated, or fine-grained, but in any case, pourable form, according to requirements, and contain varying amounts of biomass. The apparent density is from 200 to 800 $kg/m^3$, especially approximately from 400 to 700 $kg/M^3$.

Pourable in the context of this invention means freely flowing non-clumped particles of a predetermined size which are able to be dispensed from a container. The additives are readily pourable and storage stable.

If the biomass is separated off further, inorganic solids, for example those which have been added during the fermentation, are generally removed. In addition, the additive according to the invention contains at least the predominant part of the further substances, especially organic, that have been formed or added and are dissolved in the fermentation liquor, insofar as they have not been separated off by suitable processes.

Such substances include organic by-products that are produced and secreted in addition to D-pantothenic acid by the microorganisms used in the fermentation. They include L-amino acids, selected from the group L-methionine, L-lysine, L-valine, L-threonine, L-alanine or L-tryptophan, especially L-valine. They also include organic acids carrying from one to three carboxyl groups, such as, for example, acetic acid, lactic acid, citric acid, malic acid or fumaric acid. Finally, they also include sugars, such as, for example, trehalose. Such compounds may be desirable, in that they improve the nutritional value of the additive.

In a preferred form there is prepared a fermentation liquor containing D-pantothenic acid and/or salts thereof, wherein
a) the fermentation takes place in a substantially chloride-free medium,
b) the resulting fermentation liquor, optionally after separation of the biomass and concentration, is dried, compacted, spray dried, spray granulated or granulated or applied to a carrier or embedded in a stabilising matrix.

The fermentation liquors which are suitable for the process according to the invention are obtained using microorganisms suitable for the production of D-pantothenic acid and that contain D-pantothenic acid and/or salts thereof. The salts are generally sodium, potassium, ammonium, magnesium or calcium salt.

The microorganisms may be fungi or yeasts, such as, for example, *Debaromyces castellii*, or Gram-positive bacteria, for example of the genus Corynebacterium, or Gram-negative bacteria, such as, for example, those of the family Enterobacteriaceae. In the case of the family of the Enterobacteriaceae, special mention may be made of the genus Escherichia and of the species *Escherichia coli*. Within the species *Escherichia coli*, mention may be made of the so-called K-12 strains, such as, for example, strains MG1655 or W3110 (Neidhard et al.: *Escherichia coli* and Salmonella. Cellular and Molecular Biology (ASM Press, Washington D.C.)), or of the *Escherichia coli* wild type strain IFO3547 (Institut für Fermentation, Osaka, Japan) and mutants derived therefrom both of which are incorporated herein by reference. Of the strains produced from IFO3547, FV5069/pFV31 (EP-A-0 590 857) and FV5069/pFV202 (WO 97/10340) are prominent. In the case of the genus Corynebacterium, special mention may be made of the species *Corynebacterium glutamicum*.

The above-described microorganisms can be cultivated for the purposes of D-pantothenic acid production continuously or discontinuously by the batch or fed batch or repeated fed batch process. A summary of known cultivation methods is described in the textbook by Chmiel (Bioprozesstechnik 1. Einführug in die Bioverfahrenstechnik (Gustav Fischer Verlag, Stuttgart, 1991) or in the textbook by Storhas (Bioreaktoren und periphere Einrichtungen (Vieweg Verlag, Braunschweig/Wiesbaden, 1994) both of which are incorporated herein by reference.

The culture medium to be used must meet the requirements of the microorganisms to be used in a suitable manner. The fermentation medium is substantially free of chloride-containing constituents. According to the invention, the concentration of chloride ions in the production fermenter is <300 mg/l, preferably <200 mg/l and very especially preferably <150 mg/l. There may be used as the carbon source sugars and carbohydrates such as glucose, saccharose, lactose, fructose, maltose, molasses, starch and cellulose, oils and fats, such as soybean oil, sunflower oil, groundnut oil and coconut oil, fatty acids such as palmitic acid, stearic acid and linoleic acid, alcohols such as glycerol and ethanol, and organic acids such as acetic acid. Those substances may be used individually or in the form of a mixture. There may be used as the nitrogen source organic nitrogen-containing compounds, such as peptones, yeast extract, meat extract, malt extract, corn steep liquor, soybean flour and urea, or inorganic compounds, such as ammonium sulfate, ammonium phosphate, ammonium carbonate and ammonium nitrate. The nitrogen sources may be used individually or in the form of a mixture. There may be used as the phosphorus source potassium dihydrogen phosphate or dipotassium hydrogen phosphate or the corresponding sodium-containing salts. The culture medium must also contain salts of metals such as magnesium sulfate or iron sulfate, which are necessary for growth. Finally, essential growth substances, such as amino acids and vitamins, may be used in addition to the above-mentioned substances. Precursors of D-pantothenic acid, such as aspartate, β-alanine, ketoisovalerate, ketopantoic acid or pantoic acid, and, optionally, salts thereof, may also be added to the culture medium. The mentioned substances may be added to the culture in the form of a single batch, or they may be fed in a suitable manner during the cultivation.

In order to control the pH value, ammonia or ammonia water or other basic compounds, such as sodium hydroxide, potassium hydroxide or calcium hydroxide are used. If acid compounds are required to control the pH value, phosphoric acid or sulfuric acid may expediently be used. In order to prepare the calcium salt of pantothenic acid directly, calcium hydroxide in the form of an aqueous suspension is used during the fermentation. In order to control the development of foam, anti-foams such as fatty acid polyglycol esters, may be used. In order to maintain the stability of plasmids, suitable substances having a selective action, for example antibiotics, are optionally added to the medium. In order to maintain aerobic conditions, oxygen or gas mixtures containing oxygen such as air, are introduced into the culture. The temperature of the culture is normally from 20° C. to 45° C. and preferably from 25° C. to 40° C. The culture is continued until the maximum amount of D-pantothenic acid has formed, which is generally within a period of 10 hours to 160 hours.

The fermentation liquors thus obtained usually have a content of dry matter of 7.5 to 25 wt. % and contain from 2 to 20 wt. % D-pantothenic acid. Fermentation processes in which D-pantothenic acid is present in the dry matter in an amount of at least 20 wt. % when the fermentation is complete are especially advantageous. It is also advantageous for the amount of sugar in the fermentation to be limited at least at the end of the fermentation, but advantageously for at least 30% of the duration of the fermentation. That means that the concentration of usable sugar in the fermentation medium is maintained at, or reduced to from >0 to 3 g/l during that time.

For the preparation of the additives according to the invention, the fermentation liquors containing D-pantothenic acid and/or salts thereof are preferably first freed of all or part of the biomass by known separation methods such as centrifugation, filtration, decantation or a combination thereof. However, it is also possible according to the invention to leave all of the biomass in the fermentation liquor. The suspension obtained in that manner is then concentrated preferably to not more than 60 wt. % dry matter and worked up to a powder, for example with the aid of a spray drier or a lyophilising apparatus. The powder is then converted into a coarser-grained, readily pourable, storable and largely dust-free product by suitable compacting or granulating processes. In the granulating or compacting operation it is advantageous to use conventional organic or inorganic auxiliary substances, or carriers, such as starch, gelatin, cellulose derivatives or similar substances, as are conventionally employed as binders, gelling agents or thickeners in the processing of foodstuffs or feeds, or further substances such as, for example, silicas, silicates or stearates.

Alternatively, the product may be applied to an organic or inorganic carrier substance that is known and conventionally employed in the processing of feeds, such as, for example, silicas, silicates, meals, brans, flours, starches, sugars or the like, and stabilised by means of conventional thickeners or binders. Relevant examples and processes are described in the literature (Die Mühle+Mischfuttertechnik 132 (1995) 49, page 817) which is incorporated herein by reference.

The novel solid products according to the invention that contain D-pantothenic acid and/or salts thereof and that can be prepared by the above-described process contain from 20 to 80 wt. %, preferably from 30 to 75 wt. %, D-pantothenic acid. They generally contain inorganic constituents in an amount of from 2.5 to 25 wt. % and optionally organic by-products in an amount of from >0 to 30 wt. %. The content of dry biomass is from $\geq 0$ to 35 wt. %. The water content is preferably <5 wt. %.

The novel products according to the invention that contain D-pantothenic acid and/or salts thereof and that are prepared by the above-described process are distinguished by a particle size distribution of from 20 $\mu$m to 2000 $\mu$m, preferably from 50 $\mu$m to 800 $\mu$m and especially from 150 $\mu$m to 600 $\mu$m. The content of very fine dust (<10 $\mu$m) is approximately from 0 wt. % to 10 wt. %, preferably approximately from 0 wt. % to 5 wt. %. The product is used as a feed additive.

The concentration of D-pantothenic acid can be determined by known methods (Velisek; Chromatographic Science 60, 515–560 (1992)).

The particle size distribution can be determined by methods of laser diffraction spectrometry. Corresponding methods are described in the textbook on "Teilchengrössenmessung in der Laborpraxis" by R. H. Müller and R. Schuhmann, Wissenschaftliche Verlagsgesellschaft Stuttgart (1996) or in the textbook "Introduction to Particle Technology" by M. Rhodes, Verlag Wiley & Sons (1998) both of which are incorporated herein by reference.

EXAMPLES

The present invention is explained in greater detail below by means of Examples. To that end, tests have been carried out using the D-pantothenic acid-producing strain Escherichia coli 5069/pFV31, which has been deposited as FERM-BP 4395 in accordance with the Budapest Treaty at the Fermentation Research Institute, Agency of Industrial Science and Technology in 1-1-3, Higashi, Tsukuba-shi, Tbaraki (Japan) (EP-A-0590857).

The measurements were carried out on a Cilas 920 laser diffraction spectrometer from Quanto Chrome (Odelzhausen, Germany). Evaluation of the measurement results was carried out as specified in German Industrial Standard DIN 66141 for representation of the particle size distribution.

Example 1

Preparation of the calcium salt of D-pantothenic acid in a fermentation liquor

1. Preparation of inoculum (master cell bank)

A sample of *Escherichia coli* FV5069/pFV31 was spread on LBG agar to which 50 $\mu$g per ml ampicillin had been added. The agar plate culture was incubated for 17 hours at 37° C. and then stored in a refrigerator at +4° C. Selected individual colonies were then multiplied further in LBG bouillon. LBG bouillon has the following composition: 10 g/l peptone, 5 g/l yeast extract, 5 g/l NaCl and 1 g/l glucose. LBG agar additionally contains 12 g/l agar. Ready-made preparations can be obtained from Gibco/BRL (Paisley, Scotland, Great Britain) as LB broth base or LB agar. After the addition of 1 g/l glucose, the indicated media are then obtained. 10 ml cultures, which were contained in 100 ml Erlenmeyer flasks, were incubated for 16 hours at 37° C. and 180 rpm in an ESR incubator from Kühner AG (Birsfelden, Switzerland). The cell suspension was then separated by centrifuging in a J-6B centrifuge from Beckmann (Hanover, Germany) for 15 minutes at 4000 rpm. The cell pellet was re-suspended in 10 ml of LBG medium to which 20% glycerol had been added; 1 ml was introduced under sterile conditions into each of 10 aliquots and frozen at −70° C. Those cultures were used as the master cell bank.

For the preparation of a working cell bank, LBG medium to which 50 $\mu$g/ml ampicillin had been added was divided into 10 ml portions in 100 ml Erlenmeyer flasks and then inoculated with 100 $\mu$l of the above-described master cell bank. Incubation was carried out for 16 hours at 37° C. and 180 rpm in an ESR incubator from Kühner AG (Birsfelden, Switzerland).

After incubation, the optical density (OD) of the culture suspension was determined at a measuring wavelength of 660 nm using an LP2W photometer from Dr. Lange (Berlin, Germany). It was 3.5. The cell suspension was then introduced under sterile conditions into sterile 30 ml polyethylene tubes from Greiner (Frickenhausen, Germany) and separated by centrifuging at 2500 rpm for 15 minutes using a J-6B centrifuge from Beckmann (Hanover, Germany). The biomass that had been separated off was re-suspended in 10 ml of LBG medium to which 20% glycerol had been added. The cell suspension was then introduced in 500 $\mu$l portions, under sterile conditions, into 1 ml sterile tubes from Nalgene (New York, U.S.A.) and frozen at −70° C. The preserved batches so prepared were used as the working cell bank.

2. Preparation of a fermentation liquor containing calcium D-pantothenate

For the preparation of a fermentation liquor containing calcium D-pantothenate, the working cell bank was first multiplied in a shaking flask culture, and the latter was used to inoculate a pre-fermenter. The pre-fermenter culture was used to inoculate the production fermenter.

SKA medium (Table 1) was used for the shaking flask culture. SKA medium was prepared as follows: 7.0 g of $(NH_4)_2SO_4$, 0.5 g of $KH_2PO_4$, 1.0 g of $K_2HPO_4$, 0.5 g of $MgSO_4 \cdot 7H_2O$, 0.01 g of $MnSO_4 \cdot H_2O$, 0.001 g of $ZnSO_4 \cdot 7H_2O$, 0.005 g of $Fe_2(SO_4)_3$ and 20 g of corn steep liquor, which had previously been adjusted to pH 6.8 using 25% ammonia solution, were weighed into a 1 litre glass beaker and then made up to 825 g with distilled water. That salt solution containing corn steep liquor was sterilised in an autoclave at 121° C. for 20 minutes. In addition, a solution consisting of 25 g of glucose and 0.002 g of thiamin. HCl was made up to 125 g with distilled water and sterilised by filtration. 10 g of $CaCO_3$ were weighed into a 100 ml flask and sterilised in an autoclave at 123° C. for 20 minutes. SKA medium was obtained by combining the above-mentioned two components with the salt solution containing corn steep liquor.

The SKA medium was divided into 12.5 ml portions in 100 ml Erlenmeyer flasks and was then inoculated with 0.5 ml of a cell suspension. The cell suspension used was a preserved batch of the working cell culture diluted 1:100 with sterile physiological saline. Incubation was carried out for 20 hours at 32° C. and 150 rpm on an RC-1-TK incubator from Infors AG (Bottrmingen, Switzerland). The optical density determined thereafter at a measuring wavelength of 660 nm (OD 660) was 12.5.

For the inoculation of 20 kg of A1-102 pre-culture medium, which was contained in a 42 litre stirred reactor fermenter from Bioengineering (Wald, Switzerland, model LP-42), 0.5 ml of SKA medium was diluted 1: 100 and 50 ml of that suspension were added to the fermenter. The pre-culture medium A1-102 contained the constituents listed in Table 2. The culture was cultivated for 15.5 hours at a temperature of 37° C., with volume-specific aeration of 0.5 volume/volume/minute (vvm), at an oxygen partial pressure of 20% of air saturation and at a pH of 6.5, until an OD660 of 11.3 was reached.

For the inoculation of 5830 g of M1-380 main culture medium, which was contained in 14 litre stirred reactor fermenters from B. Braun (BBI, Germany, Melsungen, model Biostat E/ED), 423 ml of the second pre-culture in A1-102 medium were added. M1-380 main culture medium contained the constituents listed in Table 3. The culture was first cultivated for 6.5 hours at a temperature of 37° C., with volume-specific aeration of 0.75 vvm, with minimum stirring of 400 rpm and at a pH of 6.5, until an OD660 of 18.6 and an oxygen partial pressure of 2% of air saturation had been reached. The culture was then cultivated for a further 41 hours at a temperature of 37° C., an oxygen partial pressure of 2% of air saturation and a pH value of 6.0, until an OD660 of 66.8 had been reached. After a fermentation time of 13 hours, β-alanine was fed in a concentration of 152.7 g in 570 ml of $H_2O$ over a period of 34.5 hours. After a fermentation time of 21.5 hours, a ten percent $Ca(OH)_2$ solution was metered in over a period of 26 hours in order to control the pH. 3.43 kg of M2-257 medium having a glucose concentration of 650.8 g/l and a concentration of thiamin.HCl of 35.7 g/l were fed in in the course of 41 hours.

The optical density (OD) was then determined at a measuring wavelength of 660 nm using an LP1W type digital photometer from Dr. Bruno Lange GmbH (Berlin, Germany), and the concentration of D-pantothenic acid that had formed was determined by means of HPLC (Hypersil APS 2 5 μm, 250×5 mm, RI detection).

A calcium D-pantothenate concentration of 49.7 g/l, measured as D-pantothenic acid, was determined in the final fermentation sample after 70.0 hours.

The content of D-pantothenic acid was determined with the aid of a type M321 HPLC (high-performance liquid chromatography) apparatus from Knauer (Berlin, Germany) by means of RI (refractive index) detection using a Hypersil APS2 amino phase of particle size 5 μm.

TABLE 1

Composition of SKA medium

| Component | Concentration (per liter) |
| --- | --- |
| Glucose | 25.0 g |
| Corn steep liquor | 20.0 g |
| $(NH_4)_2SO_4$ | 7.0 g |
| $KH_2PO_4$ | 0.5 g |
| $K_2HPO_4$ | 1.0 g |
| $MgSO_4 \cdot 7H_2O$ | 0.5 g |

TABLE 1-continued

Composition of SKA medium

| Component | Concentration (per liter) |
| --- | --- |
| $FeSO_4 \cdot 7H_2O$ | 5 mg |
| $MnSO_4 \cdot H_2O$ | 10 mg |
| $ZnSO_4 \cdot 7H_2O$ | 1 mg |
| $CaCO_3$ | 10 g |
| Thiamin chloride · HCl | 2 mg |
| Structol | 0.7 g |

TABLE 2

Composition of A1-102 medium

| Component | Concentration (per liter) |
| --- | --- |
| Glucose | 25.0 g |
| Corn steep liquor | 20.0 g |
| $(NH_4)_2SO_4$ | 7.0 g |
| $KH_2PO_4$ | 0.5 g |
| $K_2HPO_4$ | 1.0 g |
| $MgSO_4 \cdot 7H_2O$ | 0.5 g |
| $FeSO_4 \cdot 7H_2O$ | 10 mg |
| $MnSO_4 \cdot H_2O$ | 10 mg |
| Thiamin chloride · HCl | 3 mg |
| Structol | 0.6 g |

TABLE 3

Composition of M1-380 medium

| Component | Concentration (per liter) |
| --- | --- |
| Glucose | 18.0 g |
| Corn steep liquor | 40.0 g |
| β-Alanine | 15.0 g |
| $(NH_4)_2SO_4$ | 11.8 g |
| $KH_2PO_4$ | 0.6 g |
| $K_2HPO_4$ | 1.2 g |
| $MgSO_4 \cdot 7H_2O$ | 0.67 g |
| $MnSO_4 \cdot H_2O$ | 10 mg |
| Thiamin chloride · HCl | 1.6 mg |
| Structol | 0.6 g |

Example 2

Preparation of finely divided calcium D-pantothenate from fermentation liquor

The biomass was first separated from a calcium D-pantothenic acid-containing fermentation liquor that had been prepared according to the process of Example 1 and contained approximately 4.9 wt. % D-pantothenic acid. To that end, 90 litres of the above-mentioned fermentation liquor were filtered off by cross-flow filtration using a 0.22 μm microfiltration membrane in a CERAFLO MSP005756 filtration apparatus from Millipore (Bad Homburg, Germany).

The liquor so treated was then concentrated to a liquid content of approximately 30% dry content in a Rotavapor R-152 rotary evaporator from Büchi, Switzerland at from 40 to 80° C., in vacuo. The liquor so concentrated was then spray dried in order to prepare the calcium salt of D-pantothenic acid. To that end there was used a Technikum spray drier from Niro (Copenhagen, Denmark) of the NIRO Minor type having an atomising plate (120 mm diameter;

speed of rotation 135 m/sec.) at an inlet temperature of 175° C., an outlet temperature of 80° C. and a drying gas throughput of 525 m³/hour. For the purposes of better discharge of the product, Sipernat 22 from Degussa-Hüls AG (Frankfurt am Main, Germany) was added as powder auxiliary to the drying gas stream in a ratio of 5 wt. %, based on dry matter in the concentrate.

The calcium D-pantothenate-containing product so prepared had a D-pantothenic acid content of 48.5 wt. %, was pourable and had an apparent density of 460 kg/m³ with a mean particle size of 34 μm.

TABLE 4

| Designation | Diameter | Content [%] |
|---|---|---|
| Fine dust | <10 μm | 10 |
| Dust | 10–20 μm | 20 |
| Powder/dust | 20–50 μm | 50 |
| Powder | >50 μm | 20 |

Example 3
Preparation of D-calcium pantothenate having a particle size >100 μm by compaction in a roll compactor and sieving A calcium D-pantothenic acid-containing dust-like product, which had been prepared according to the process of Example 2 and contained approximately 48.5 wt. % D-pantothenic acid and had a mean particle size of 34 μm, was compacted by means of a roll compactor having cigar-like rolls (Pharmapaktor from BEPEX of type L200/50 P) with a compressive force of from 40 to 90 Newtons. The speed of rotation of the rolls was 10 revolutions per minute. The compacted product so prepared was then broken down to a particle size distribution of from 200 to 400 μm in comminution sieves. The yield in the individual particle fractions is summarised in Table 5.

The compacted product was distinguished by a markedly lower content of fine dust and substantially improved flow behaviour as compared with the pulverulent starting product.

TABLE 5

| Designation | Diameter | Content [%] |
|---|---|---|
| Fine dust | <10 μm | 5 |
| Dust | 10–50 μm | 5 |
| Fines | 50–200 μm | 20 |
| Mean particle size | 200–400 μm | 50 |
| Oversize particles | >400 μm | 20 |

The fraction "mean particle size" was isolated by sieving and represents the product. The product so prepared had a content of approximately 40.7 wt. %, measured as D-pantothenic acid, and had an apparent density of 630 kg/m³.

Example 4
Preparation of D-calcium pantothenate having a mean particle size of from 200 to 400 μm by build-up granulation in a fluidised-bed granulator
4.1 Use of water as the granulation binder Pulverulent product containing calcium D-pantothenic acid, which had been prepared from a fermentation solution containing calcium D-pantothenic acid by spray drying according to the process described in Example 2, was subsequently processed further in a fluidised-bed granulator by spraying with a particular amount of water.

To that end, 300 g of the dust-like calcium D-pantothenic acid-containing product prepared according to Example 2 were placed in a laboratory fluidised-bed apparatus from Aeromatics Niro (Copenhagen, Denmark). At a fluidised bed temperature of 50° C. and a waste gas temperature of 30° C., 3 g of water per minute were sprayed in via a metering device. The fluidised gas temperature was from 70 to 80° C. The particle size distribution of the product so prepared is shown in Table 6.

TABLE 6

| Designation | Diameter | Content [%] |
|---|---|---|
| Fine dust | <10 μm | 1 |
| Dust | 10–50 μm | 4 |
| Fines | 50–200 μm | 20 |
| Mean particle size | 200–400 μm | 75 |
| Oversize particles | >400 μm | 0 |

The content, measured as D-pantothenic acid, was determined as 38.1 wt. %. The product was almost dust-free. The apparent density was 310 kg/m³. The product was very readily pourable.
4.2 Use of a concentrate containing calcium pantothenate as the granulation binder A pulverulent product containing calcium D-pantothenic acid, which had been prepared from a calcium D-pantothenic acid-containing fermentation solution by spray drying according to the process described in Example 2, was processed further in another test in a fluidised-bed granulator by spraying with a particular amount of concentrated calcium D-pantothenate solution having a content of dry matter of approximately 50 wt. %.

To that end, 1000 g of the dust-like calcium D-pantothenic acid-containing product prepared according to the process described in Example 2 were placed in a laboratory fluidised-bed apparatus, which operated batchwise, from Glatt (Binzen, Germany). At a fluidised bed temperature of approximately from 40 to 45° C. and an inlet air temperature of approximately 80° C., approximately 5 g of the above-described concentrate per minute were sprayed into the laboratory fluidised-bed apparatus. The particle size distribution of the product so prepared is shown in Table 7.

TABLE 7

| Designation | Diameter | Content [%] |
|---|---|---|
| Fine dust | <10 μm | 1 |
| Dust | 10–50 μm | 2 |
| Fines | 50–200 μm | 18 |
| Mean particle size | 200–400 μm | 79 |
| Oversize particles | >400 μm | 0 |

The content, measured as D-pantothenic acid, was determined as 38.9 wt. %. The product was almost dust-free. The apparent density was 400 kg/m³.

By means of the process described herein, or by means of a different spray, fluidised-bed, stirring or mixing process, the concentrate containing D-calcium pantothenate or D-pantothenic acid is sprayed onto other conventional organic or inorganic carriers or auxiliary substances, such as silicas, silicates, meals, brans, flours, starches, sugars or the like, and granulated, optionally with the use of binders, gelling agents or other formulation auxiliaries.

Example 5
Preparation of D-calcium pantothenate having a mean particle size from 100 to 400 μm by mixing and granulation in a vacuum drier The biomass was first separated from a calcium D-pantothenic acid-containing fermentation liquor that had been prepared according to the process of Example 1 and contained approximately 4.9 wt. % D-pantothenic acid. To that end, 90 litres of the above-mentioned fermentation liquor were filtered off by cross-flow filtration using a 0.22 μm microfiltration membrane in a CERAFLO MSP005756 filtration apparatus from Millipore (Bad Homburg, Germany).

The liquor so treated was then concentrated to a liquid content of approximately 50 wt. % dry content in a Rotavapor R-152 rotary evaporator from Buichi, Switzerland, at from 40 to 80° C., in vacuo. The calcium D-pantothenic acid-containing concentrate so prepared having a D-pantothenic acid content of 28.8 wt. % was then mixed with a silica (Sipemat 22, Degussa-Hüls AG, Frankfurt Germany) with the aid of a vacuum drier (type VT 130, Gebrüder Lödige Maschinenbau GmbH, Paderborn, Germany) to form a freely flowable granulate. 15 kg of the silica (Sipemat 22, Degussa-Hüls AG, Germany) were first placed in the vacuum drier (type VT 130, Gebruder Lödige Maschinenbau GmbH, Germany), and then 39.0 kg of the calcium D-pantothenic acid-containing concentrate prepared above were added at a rate of 2.0 kg per minute under a vacuum of 200 mbar, with the material to be mixed having a temperature of 45° C., and with a stirrer performance of 120 rpm (revolutions per minute). The mixing operation was then continued for a further 15 minutes while increasing the vacuum to 50 mbar. The D-calcium pantothenate-containing granulate so prepared was then dried to a residual moisture content of less than 2 wt. % in a vibratory fluidised-bed drier (Escher-Wyss, Linden, Germany) having a fluidised-bed surface area of 0.3 m$^2$ with a bed temperature of 65° C. and a drying gas throughput of 270 Nm3/hour. Table 8 shows the average particle size distribution of the product.

TABLE 8

| Designation | Diameter | Content [%] |
| --- | --- | --- |
| Fine dust | <10 μm | 1 |
| Dust | 10–50 μm | 2 |
| Fines | 50–125 μm | 6 |
| Mean particle size | 200–400 μm | 89 |
| Oversize particles | >400 μm | 2 |

The content, measured as D-pantothenic acid, was determined as 32.6 wt. %. The product was almost dust-free. The apparent density was 650 kg/m$^3$ after drying.

By means of the process described herein, or by means of a different spray, fluidised-bed, stirring or mixing process, the concentrate containing D-calcium pantothenate or D-pantothenic acid can be sprayed onto other conventional organic or inorganic carriers or auxiliary substances, such as silicas, silicates, meals, brans, flours, starches, sugars, and granulated, optionally with the use of binders, gelling agents or other formulation auxiliaries.

Numerous modifications and variations of the present invention are possible in light of the above teachings. It is therefore to be understood that within the scope of the appended claims, the invention may be practiced otherwise than as specifically described herein.

This application is based on German patent application serial No. 100 32 349.9, filed on Jul. 4, 2000, the contents of which are incorporated herein by reference.

What is claimed is:

1. A feed additive composition comprising:
   at least one of D-pantothenic acid and a salt of D-panthothenic acid;
   greater than 50 percent of further non-biomass constituents of a D-pantothenic fermentation liquor; and
   0 to 100% of the biomass from said D-pantothenic fermentation liquor, wherein said composition is a solid, pourable composition in the form of particles.

2. The composition according to claim 1, wherein the particle size of the additive is from 20 μm to 2000 μm, inclusive.

3. The composition according to claim 1, wherein the particle size of the additive is from 50 μm to 800 μm, inclusive.

4. The composition according to claim 1, wherein the particle size of said additive is from 150 μm to 600 μm, inclusive.

5. The composition according to claim 1, further comprising chloride containing constituents in a concentration of <3 mg/g of additive.

6. The composition according to claim 1, further comprising chloride containing constituents in a concentration of <2 mg/g of additive.

7. The composition according to claim 1, farther comprising chloride containing constituents in a concentration of <1.5 mg/g of additive.

8. The feed additive composition according to claim 1, wherein the salt is at least one selected from the group consisting of sodium salt of D-pantothenic acid, potassium part of D-pantothenic acid, ammonium salt of D-pantothenic acid, magnesium salt of D-pantothenic acid and calcium salt of D-pantothenic acid.

9. The composition according to claim 1, wherein the feed additive contains from 20–80 wt. % D-pantothenic acid and/or a salt of D-pantothenic acid.

10. The composition according to claim 9, wherein the chloride content of the feed additive is <3.0 mg/g of additive.

11. The composition according to claim 9, wherein the chloride content of the feed additive is <2.0 mg/g of additive.

12. The composition according to claim 9, wherein the chloride content of the feed additive is <1.5 mg/g of additive.

13. The composition according to claim 1, wherein the feed additive contains at least one L-amino acid selected from the group consisting of L-methionine, L-lysine, L-valine, L-alanine, L-threonine or L-tryptophan.

14. The composition according to claim 1, wherein said composition is an additive for animal feed.

15. A process for preparing a feed additive composition containing D-pantothenic acid and/or at least one salt of D-pantothenic acid, said process comprising:
   fermenting D-pantothenic acid and/or salts of D-pantothenic acid in a fermentation liquor;
   separating a biomass from said fermentation liquor by centrifugation, filtration, decantation or a combination thereof;
   drying the fermentation liquor; and
   granulating said dried fermentation liquor to obtain particles having a size distribution of from 20 μm to 2000 μm.

16. The process according to claim 15, further comprising concentrating the fermentation liquor prior to granulation.

17. The process according to claim 15, further comprising adding at least one from the group consisting of a hydroxide of an alkaline earth metal, an oxide of an alkaline earth metal, a hydroxide of an alkali metal and an oxide of an alkali metal to the fermentation liquor prior to drying the liquor.

18. The process according to claim 17, wherein said fermentation liquor is concentrated prior to granulation.

19. The process according to claim 17, wherein the oxide or the hydroxide is added in a stoichiometric ratio of from 0.8 to 1.2 based on the D-pantothenic acid.

20. The process according to claim 17, wherein the oxide or the hydroxide is added in a stoichiometric ratio of from 0.95 to 1.1 based on the D-pantothenic acid.

21. The process according to claim 16, further comprising adding said particles to animal feed.

* * * * *